US011295271B2

(12) United States Patent
Williams et al.

(10) Patent No.: US 11,295,271 B2
(45) Date of Patent: Apr. 5, 2022

(54) SYSTEM AND METHOD FOR ALERTING ATTENDANTS REGARDING SERVICE AREA DISPENSER REFILL NEEDS

(71) Applicant: Kimberly-Clark Worldwide, Inc., Neenah, WI (US)

(72) Inventors: Frederick J. Williams, Cumming, GA (US); Babak R. Ghazi, Atlanta, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 175 days.

(21) Appl. No.: 16/309,993

(22) PCT Filed: Jun. 28, 2016

(86) PCT No.: PCT/US2016/039784
§ 371 (c)(1),
(2) Date: Dec. 14, 2018

(87) PCT Pub. No.: WO2018/004535
PCT Pub. Date: Jan. 4, 2018

(65) Prior Publication Data
US 2019/0258997 A1     Aug. 22, 2019

(51) Int. Cl.
*G06Q 10/06* (2012.01)
*G06Q 10/00* (2012.01)
(Continued)

(52) U.S. Cl.
CPC ... *G06Q 10/0875* (2013.01); *G06Q 10/06311* (2013.01); *G06Q 10/20* (2013.01); *G06Q 10/04* (2013.01)

(58) Field of Classification Search
None
See application file for complete search history.

(56) References Cited

U.S. PATENT DOCUMENTS

| 8,160,742 B2 | 4/2012 | Goerg et al. |
| 2013/0035966 A1* | 2/2013 | Weiss ................... G06Q 10/083 705/5 |

(Continued)

FOREIGN PATENT DOCUMENTS

| CN | 204374734 U | 6/2015 |
| JP | 2007-188333 A | 7/2007 |

(Continued)

OTHER PUBLICATIONS

Zwahlen, Ryan; Lucas, Sarah; Woika, Sara; Goforth, Faith; Hanreck, Logan; and Schirripa, Rachel, "Cleaning The World One SmartLink At A Time" (2018). IdeaExchange at University of Akron, Honors Research Projects, pp. 1-41. (Year: 2018).*

(Continued)

*Primary Examiner* — Amanda Gurski
(74) *Attorney, Agent, or Firm* — Dority & Manning, P.A.

(57) ABSTRACT

A system and method are provided for maintenance of service areas within a facility by a plurality of attendants, wherein each service area has one or more product dispensers that require periodic refill. Via a sensor configured with each product dispenser and a control system in communication with the sensors, a product level or amount of product in each dispenser is determined. Based on information from the sensors, a respective refill time is computed for refilling each of the dispensers. Location of the attendants is tracked on a continuous or periodic basis. As a function of the computed refill times and location of the various attendants, one of the attendants is selected to service one or more of the product dispensers in a particular service area. An alert message is generated and transmitted to the selected attendant that gives the location of the particular service area within the facility. Determination of the selected attendant is made such that the selected attendant reaches the particular service area at or near the computed refill time of the one or (Continued)

more product dispensers in the particular service area facility.

15 Claims, 2 Drawing Sheets

(51) Int. Cl.
*G06Q 10/04* (2012.01)
*G06Q 10/08* (2012.01)

(56) References Cited

U.S. PATENT DOCUMENTS

2014/0142966 A1* 5/2014 Badgett .............. G06Q 10/0633
 705/2
2015/0206077 A1 7/2015 Himmelmann et al.
2015/0228181 A1* 8/2015 Himmelmann ...... G08B 21/245
 340/573.1

FOREIGN PATENT DOCUMENTS

JP 2007/284231 A 11/2007
WO WO-2018053627 A1 * 3/2018 ........... A47K 5/1217

OTHER PUBLICATIONS

PCT Search Report, dated Jan. 10, 2017.
Chinese Search Report Corresponding to Application No. 201680085907 dated Jul. 20, 2020.
Korean Office Action Corresponding to Application No. 1020197000819 dated Feb. 27, 2020.

* cited by examiner

SYSTEM AND METHOD FOR ALERTING ATTENDANTS REGARDING SERVICE AREA DISPENSER REFILL NEEDS

FIELD OF THE INVENTION

The present invention relates generally to a system and method for instructing maintenance attendants regarding consumable product replacement or dispenser refills, including in public or semi-private service areas, such as public restrooms, wherein the attendants are provided instructions regarding product usage and replacement times as a function of labor optimization considerations.

BACKGROUND

With respect to typical workplace service areas, such as those facilities in a manufacturing plant, health care facility, office building, and the like, maintenance of the service areas is generally assigned to a maintenance team member ("attendant") that visits the service area on a scheduled or periodic basis to refill dispensers and ensure the cleanliness of the facility. The same attendant or attendants may be assigned responsibility for a multitude of service areas within the building or site.

In general, the attendant has little to no knowledge of the condition of the facility, especially the fullness state of the various product dispensers, until actually entering the facility. In this regard, the attendant must be prepared for completely empty dispensers in all of the service areas they are responsible for. The refill supplies are generally not stocked in the service areas, and the attendant must carry sufficient refill supplies for a "worst case scenario", which can be an overly burdensome task depending on the number of service areas and types of dispensers. In view of this, it has been found that significant product wastage can be attributed to certain refill practices by the attendants.

For example, a towel dispenser may be one-third full when checked by an attendant. It is a common practice, however, to attempt to overstuff the dispenser with a full refill during a scheduled maintenance visit. This overstuffed condition often results in jamming of the dispenser or overuse of towels by the service area patrons, for example when multiple towels are dispensed as a result of the overstuffed condition. If the dispenser has an overstuff-prevention device, it is also a practice to discard the remaining towels in the dispenser to that a new, full, refill can be loaded into the dispenser. Over time, such wastage can be quite expensive for the building proprietor.

When the attendant has been assigned responsibility for a number of service areas within a facility or site, it is the typical practice for the attendant to establish a route between the service areas for filling the dispensers regardless of the actual depletion state of the consumable product or whether it would be more efficient for a different attendant to replace the product at the same or a different time. This practice can also lead to significant wastage over time.

The industry would benefit from a system and method wherein service area attendants are provided with specific instructions regarding the conditions and requirements for product replacement in particular service area facilities as a function of a predictive method that balances labor optimization with product replacement while minimizing product wastage.

SUMMARY OF THE INVENTION

Objects and advantages of the invention will be set forth in part in the following description, or may be obvious from the description, or may be learned through practice of the invention.

A method and associated service area system are presented incorporating aspects of the invention. The term "service area" is used generically herein to encompass any manner of public, semi-public, or private facility visited by patrons or employees to use sink or toilet facilities, bathing facilities, changing facilities, sanitation facilities, and so forth. The term "service area" includes any location or type of facility where product dispensers are installed, such as break rooms, food processing sanitization stations, industrial manufacturing floors, and so forth. Particular non-limiting examples of such service areas referred to in this description for explanation purposes are washroom facilities (also known as restrooms), toilet closets, public bathrooms, men's room, ladies' room, and the like. A typical public or semi-private service area has a number of toilet facilities or urinals and sinks.

Although the present method and service area system are particularly useful in an "away-from-home" public or semi-private environment, the system is not limited by scope of use. As used herein, the term "away-from-home" means a place or location where people congregate for various reasons or purposes that are outside the typical home. Examples of away-from-home locations include places of business, such as office buildings, office suites, retail stores, and warehouses, manufacturing facilities; schools; hospitals and other types of medical facilities; places of worship; hotels and motels; conference centers; and the like. The method and system are particularly well-suited for structures or facilities wherein multiple service areas are provided for use of the building tenants, or an industrial or manufacturing site wherein multiple site facilities are provided for a controlled populace. All such locations, structures, and sites are referred to generically herein as a "facility." It should be appreciated though that the present service area system and method may prove useful in a residential or private environment, and such uses are within the scope and spirit of the invention.

In accordance with aspects of the invention, a system and related method are provided for maintenance of a plurality of service areas in a facility by maintenance personnel (also referred to herein as "attendants"). Such attendants may be members of a janitorial service that has responsibility for upkeep, restocking, and cleanliness of the service areas on a daily or other periodic basis, or members of a building support staff, and so forth. Each of the service areas has one or more consumable product dispensers that require periodic refill, such as paper product dispensers, soap dispensers, toilet tissue dispensers, and so forth. Within each service area, the product dispensers are configured with a sensor that detects a level or amount state of the product remaining in the dispenser. The sensors are in communication with a control station assigned to the service area, wherein the control station collects usage data related to the various dispensers (among other tasks). The control station may include any manner of computer hardware/software system configuration for this purpose, and may be in communication with the sensors via a wired or wireless communication network.

A plurality of the service areas may be assigned to a common control station. For example, all of the service areas within a building or site location may communicate with the same control station via a suitable wired or wireless communication network. The control station may include or be interfaced with any manner of server system for carrying out the functions described herein. The server system may be a remote system that functions with a plurality of the control stations, or may be a dedicated system for each service area.

In accordance with the invention, the method includes detecting the product levels or amounts via the control station and linked sensors. Based on information from the sensors, the control station computes a respective refill time for refilling each of the product dispensers. In one embodiment, this refill time may correspond to the actual time when the dispenser becomes completely depleted such that there is essentially no product wastage. In other embodiments, the refill time may be computed based on leaving a minimum predetermined amount of product in the dispenser. For example, the refill time may be computed to correspond to an anticipated time when 5% (or other amount) of the product remains in the dispenser.

The method further includes tracking location of the numerous attendants within the facility on a continuous or periodic basis by any suitable system, wherein such location information is also transmitted to the control station. This may include predicting or inferring attendant location and routes based on historical data, such as recorded activity logs that note time and activity performed by the various attendants within the facility.

The method includes selecting one of the attendants to service one or more of the product dispensers in a particular service area as a function of the computed refill times and location of the attendants.

An alert message is generated and transmitted to the selected attendant, the message giving the location of the particular service area within the facility.

In accordance with the method, the selected attendant is determined such that the attendant reaches the particular service area at or near (within a predetermined acceptable deviation) the computed refill time of the one or more product dispensers in the particular service area facility.

In a particular embodiment, determination of the selected attendant is based on an actual distance from the various attendants to the particular service area when the alert message is generated or transmitted, as well as a predicted time for the selected attendant to reach the particular service area based on any number of facility-specific factors or attendant-specific factors. For example, one attendant may be physically closer to the alerting service area, but on a different floor in the building, whereas the selected attendant may be physically more distant, but on the same floor as the alerting service area.

In another embodiment, the attendants may have established maintenance routes within the facility and the predicted time is based on the selected attendant reaching the particular service area while proceeding along their maintenance route. The alerting service area may be a service area assigned to the selected attendant's maintenance route or, alternatively, may be a service area assigned to a different attendant's maintenance route. For example, it may be more labor efficient for the selected attendant to deviate from their route to service the alerting service area rather than have the attendant routinely responsible for the service area travel a greater distance within their route to reach the alerting service area at the refill time The alert message may include any manner of additional pertinent information, such as the computed refill time for the alerting dispenser, the type of dispenser, amount of product needed to refill the dispenser, and so on.

In yet another embodiment, multiple product dispensers are located in the particular service area, and when an alert message is generated for any one of the product dispensers, the method further comprises making a determination if one or more of the non-alerting product dispensers should be refilled by the selected attendant at the same time as the alerting product dispenser. This additional determination may result in slightly more product wastage from the non-alerting dispensers, but may be beneficial from a labor optimization aspect. A "hard" logic rule may be established that calls for refill of any other dispenser in the service area when the product level is below a certain value, e.g., below 10% product remaining in the dispenser. The additional determination may include computing the refill times for the non-alerting dispensers and consideration of the location of the other attendants relative to the service area. A logic determination can then be made as to whether the selected attendant should refill one or more of the non-alerting dispensers or whether another attendant is to be alerted at a later time.

To compute the dispenser refill times, a real-time depletion rate of the product may be determined based on information from the product sensors over a defined time period. This depletion rate may then be used to estimate a time when the dispenser will reach a depleted condition at which the refill times are triggered. The depletion rates may be saved and used to build a historical database for the respective dispenser, wherein such historical usage data is retrieved and used to compute the refill times for the dispenser.

The alert message need not be transmitted immediately after computing the refill time for any given dispenser. For example, the alert message may be stored in a queue and transmitted to the selected attendant when they come within a defined distance from the particular service area in the course of an established maintenance routine. Alternatively, the alert message may be held in the queue and transmitted to the first of the attendants that come within the defined distance from the service area. Thus, the selected attendant is determined to be the first one of the attendants that comes within the defined distance from the particular service area.

In a certain embodiment, instead of fixed maintenance routes for the attendants based solely on location of the service areas, the refill requirements of the dispensers in the facility may be used to generate maintenance routes for the attendants within the facility for predefined time periods based on the computed refill times within the predefined time period. For example, these routes may be generated on a shift-by-shift basis. Historical data usage or real time depletion rates may be used to compute the refill times over the entirety of the shift.

The present methodology may also be useful as an attendant training tool. For example, the method may include generating and storing a profile for each attendant that includes characteristics indicative of the individual attendant's speed and ability to refill the product dispensers at the different service areas within the facility, and the defining of maintenance routes for the attendants includes consideration of the attendant profiles with the goal being to modify one of the characteristics over time by repetitive product refill alert messages. For example, if the profile indicates that a certain attendant has difficulty maintaining the dispensers in a particular service area in their maintenance route, alert messages for this service area can be directed to the attendant on an increased frequency to aid the attendant in becoming more efficient. In another scenario, the repetitive product refill alert messages may be for increasingly more difficult product refill tasks in terms of any one or combination of distance to product dispenser, volume or amount of refill product needed, speed required to complete refill procedure within a defined time from the alert message, relative time in the attendant's work shift, or frequency of refill alert messages.

DETAILED DESCRIPTION OF THE INVENTION

Figure 1:
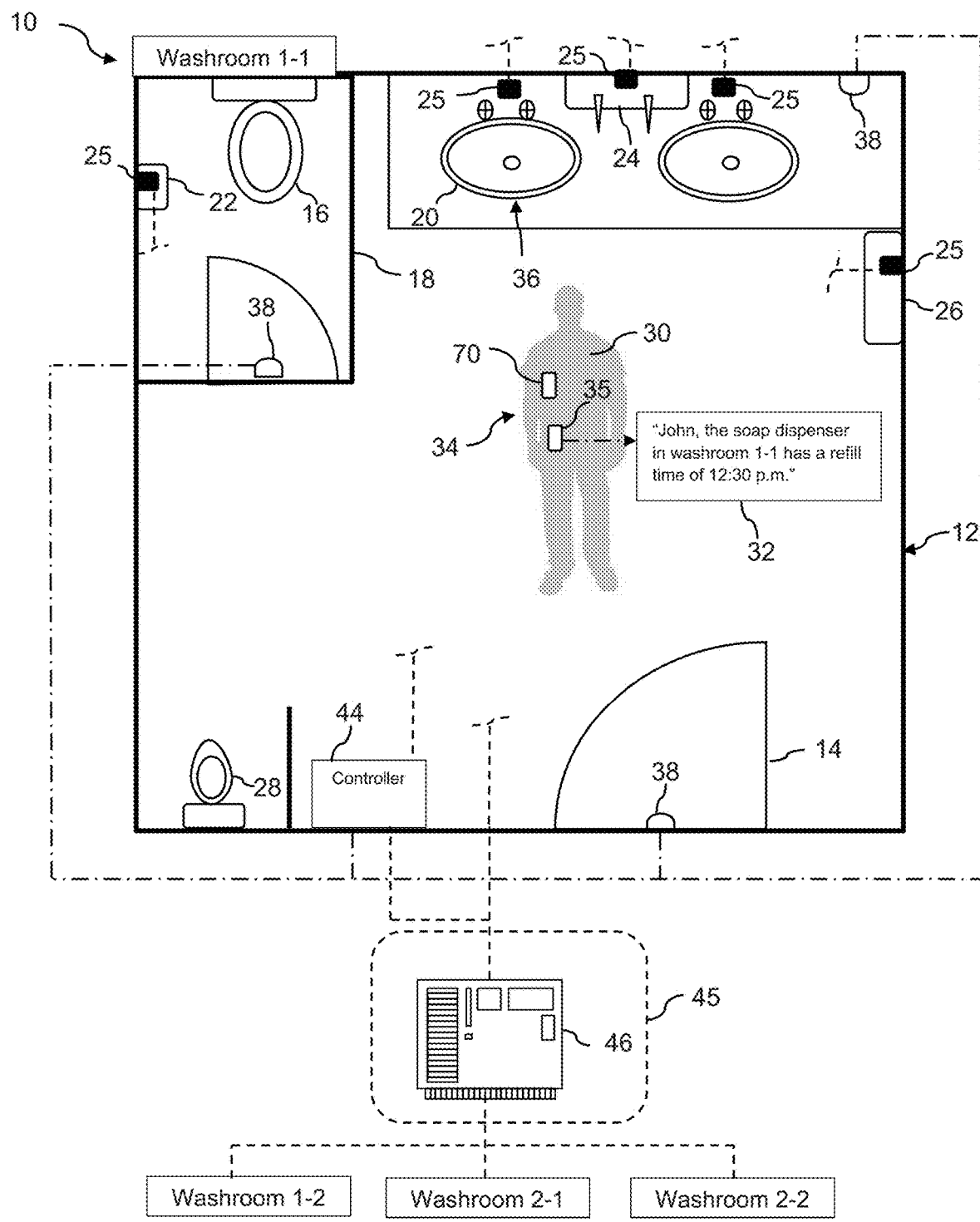
FIG. 1 is a diagram view of a service area facility incorporating a system and method in accordance with aspects of the present invention.

Reference will now be made in detail to one or more embodiments of the invention, examples of the invention, examples of which are illustrated in the drawings. Each example and embodiment is provided by way of explanation of the invention, and is not meant as a limitation of the invention. For example, features illustrated or described as part of one embodiment may be used with another embodiment to yield still a further embodiment. It is intended that the invention include these and other modifications and variations as coming within the scope and spirit of the invention.

For purposes of ease of explanation only, the service area in the illustrated embodiments is depicted as a washroom. It should be readily appreciated that the present methods and systems are not limited to washrooms, as described above.

As mentioned, in one aspect, the present invention relates to a method and system for maintenance of service areas, particularly where maintenance personnel are required to periodically refill consumable product dispensers within the service areas, such as paper towel dispensers, soap dispensers, toilet tissue dispensers, and so forth. The maintenance personnel may be members of a janitorial service that has responsibility for upkeep, restocking, and cleanliness of the service areas on a daily basis, or members of a building support staff, and so forth.

Referring to FIG. 1, an embodiment of a system and related method 10 are illustrated with respect to a public or semi-private service area 12 within a building or business site location. The building may have a plurality of similarly configured service areas 12 on one or multiple floors. For example, FIG. 1 depicts two service areas (service area 1-1 and 1-2) on a first floor of the facility and two service areas (2-1 and 2-2) on a second floor of the facility.

The design and features of the service area 12 depicted in FIG. 1 are for illustrative purposes only. The service area 12 is depicted as a men's restroom facility having one or more individual stalls 18 (with individual toilets 16) and one or more urinals 28. A number of sinks 20 are also provided. Any combination of consumable product dispensers are also be provided in the service area facility 12, such as toilet tissue dispensers 22, soap dispenser 24, towel dispenser 26, and so forth. The individual stalls 18, urinals 28, and sinks 20, may be considered as "functional locations" 36 wherein patrons may perform a desired function within the service area 12. It should be appreciated that any manner of additional functional locations 36 may also be included in the facility 12, such as shower stalls, dressing rooms, infant changing stations, and so forth.

FIG. 1 depicts maintenance personnel or attendant 30 in the service area 12. This person has responsibility for ensuring that the various product dispensers 22, 24, 26 are operable and filled, as well as the overall cleanliness of the service area 12.

Within each service area 12, the product dispensers 22, 24, 26 are configured with a sensor 25 that detects a level or amount condition of the product in the dispenser based on any number of operational principles, such as run time of the dispenser or direct measurement of the amount of product dispensed. For example, an indirect measurement of product usage may be based on an accumulated amount of run time that correlates to product usage. Direct measurement of product usage may rely on a sensor configured with the dispenser. Various types of product dispensers configured with sensors are well known in to those skilled in the art and a detailed explanation thereof is not necessary for purposes of the present disclosure. Examples of such dispensers include mechanical arm sensors (e.g., a mechanical arm/potentiometer that rests on a product roll and detects a change in roll diameter as the product is depleted), non-contact electrical sensors (e.g., IR sensors, capacitive sensors), optical sensors (camera-based sensor), weight sensors, and so forth.

The sensors 25 associated with the various product dispensers 22, 24, 26 are in communication with a control station 45 via any manner of suitable wireless communication system (as indicated by the dashed lines in FIG. 1) or wired network. The information signal from the sensors includes an identification tag (or other identification means) that identifies the particular dispenser 22, 24, 26 to the control station 45. The control station 45 is a computer-implemented system (a computer along with any software and peripheral devices that are necessary to make the computer function as described herein) that may be common to and remotely located from a plurality of the service areas 12. Alternatively, a control station 45 may be configured with each service area 12. In a particular embodiment, each service area 12 may include an individual controller 44 (which may be a hardware device or a software program that manages or directs the flow of data between two entities) that receives the signals from the various sensors 25 and relays or coordinates transfer of such signals to the control station 45. Alternately, the sensors 25 may communicate directly with a remote control station 45, as also depicted in FIG. 1.

The control station 45 may monitor a number of similarly-configured service areas 12 within the facility, as indicated by the service areas 1-2, 2-1, and 2-2 in FIG. 1. Each service area 12 may include the individual controller 44, as discussed above. The control station 45 may include or be in direct communication with a server system 46 (described in greater detail below). Information from the control system 45 may be used by the server system 46 to compute dispenser refill times, generate and transmit the alert messages, and so forth, that unique to each of the service areas 12 based upon the detected product level or amount conditions of the dispensers 22, 24, 26 in the respective service area 12. In some implementations, the control station 45, alone or in combination with the server system 46, performs such calculation.

Still referring to FIG. 1, the alert messages 32 are delivered to the attendant 30 with the refill time and other information related to one or more of the product dispensers 22, 24, and 26 within the service area 12. Although the attendant 30 is depicted within the service area 12 in FIG. 1, it is to be understood that the alert message 32 is actually delivered to the attendant at some time before he makes his way to the service area 12, with the intent being that the refill time referenced in the message 32 allows sufficient time for the attendant to reach the service area 12 from his current location.

The alert messages 32 may vary widely within their scope of content. As mentioned, the message 32 at least identifies the product that needs to be refilled, the refill time, and the particular service area, and may contain any manner of other information, such as the amount of product needed to refill the alerting dispenser, the state of other non-alerting dispensers, instructions as to whether or not to refill non-alerting dispensers, and so forth.

In the embodiment of FIG. 1, the alert message 32 is delivered to the attendant 30 via a mobile smart device 35 carried by the person 30, such as a smart phone, tablet, PDA, or other network-enabled device (all referred to herein generically as a "mobile smart device"). The messages 32 may be delivered in the form of text messages, emails, voice messages, or any other format supported by the mobile smart device 35. It should be understood that any manner of networked communication devices between the control station 45 and the attendants 30 may be used for this purpose, and that the use of mobile smart devices is for illustrative purposes only.

As mentioned, in some embodiments, the system and method depend on knowing, predicting, or inferring current location of the various attendants 30 throughout the facility. Referring to FIG. 1, the service area 12 may be configured with one or more receivers 38. A plurality of these receivers can also be strategically located throughout the facility. Each attendant 30 can be provided with an ID signal transmitter 34 that transmits an ID signal that is unique to the particular person 30 and is received by one or more of the receivers 38 depending on the person's location within the facility. In this manner, the system 10 (in particular, the server system 46) is able to track location and differentiate between attendants 30 within the facility and that enter the service area 12 to perform the refill procedures. For example, as illustrated in FIG. 1, the service area 12 includes a receiver 38 positioned above or near the entrance or door 14 to the service area 12. At this location, the receiver 38 is used to detect the attendant 30 as they enter the service area 12. Respective receivers 38 may also be located at the various functional locations 36 within the service area 12 to detect the actual refill procedures and identify the particular attendant performing the procedure. For example, if the receiver 38 located near the sinks 20 detects a particular attendant 30 for a defined period of time and the sensor 25 indicates that the soap dispenser 24 or tower dispenser 26 has been refilled, the system 10 has a positive indication that a successful refill procedure has been performed by the right attendant 30.

It should be appreciated that any manner of conventional geo-location system may be used for this purpose. For example, ID signal transmitters 34 may be carried by the attendants 30 in the form of small, portable devices 70 that are provided by the janitorial service, building supervisor, or the like, for example in the form of an attachment to a work badge, bracelet, token, dongle, and so forth. These transmitters 34 may transmit continuously, periodically, or upon being interrogated by a receiver. Receivers 38 may be spaced throughout the facility with a detection range that ensures overall coverage sufficient to locate the attendants 30 during their normal course of work, wherein the receivers 38 are in communication with the control station 45 or a local controller 44. In certain embodiments, the transmitter 34 may be incorporated with a person's mobile smart device 35, which can run a low-power GPS background application previously downloaded by the personnel 30 from a source (e.g. a website) that allows the mobile smart device to function as a GPS transmitter at times programmed by the user, for example during normal working hours. It should be appreciated that any manner of conventional location applications and systems may be utilized with the present method and system.

The transmitter devices 34 carried by the maintenance personnel 30 may be low-power devices having a defined limited transmit range such that the personnel 30 must be relatively close to a receiver 38 to be detected. Bluetooth Low Energy (BTLE) technology may be particularly well-suited for this purpose. For example, the transmitter devices 34 carried by the employees 30 may be BTLE beacons that transmit the unique ID signal as a BTLE formatted signal, and the receivers 38 are BTLE scanners strategically placed throughout the facility and configured to receive and recognize the BTLE formatted signals. BTLE beacons are commercially available and are relatively small devices that can be disguised as a "trinket" that is worn or carried by the personnel 30. For example, the BTLE beacon may be a bracelet (e.g., similar to a medical alert bracelet), a component of an identification badge worn by company employees, a decorative or functional item attached to a person's belt or clothes, and so forth.

In certain embodiments, the BTLE beacon function may be incorporated with the personnel's mobile smart device 35, which runs a low-power background application previously downloaded by the employee 30 from a source (e.g. a website) that allows the mobile smart device 35 to function as a BTLE beacon that intermittently transmits the unique BTLE signal during certain times of the day, for example during normal working hours, or other times programmed by the personnel 30.

It should be appreciated that the present systems and methods are not limited to BTLE technology. Other transmitter/receiver technologies may also be utilized for practice of the invention. For example, Near Field Communication (NFC) implementations may be utilized. In another embodiment, Radio Frequency Identification (RFID) technology may be used. Other communication technologies are also within the scope and spirit of the invention.

As mentioned, the current location of the attendants may predicted or inferred from historical data, such as recorded activity logs that note time and activity performed by the various attendants within the facility. These logs may give an indication of an attendant's route and the times between different service areas along such route.

Still referring to FIG. 1, as mentioned above, the system 10 may include a controller 44 that is in wired or wireless communication with the receivers 38 located throughout the facility. The controllers 44 may be located within the service area 12 and throughout the facility, and may be in communication with the control station 45 and/or server system 46 via any suitable communications network and includes any manner of hardware and software configuration to carry out the functions described herein.

The central control system 45 and server system 46 may include a file 54 (FIG. 2) associated with each of the service areas 12 within the monitored facility, the file containing information on each of the dispensers 22, 24, 26 within the service area 12, such as the type of dispenser, refill product, usage history, and any other pertinent information that may be used to perform various maintenance routines in the service area 12. The signals generated by the various product level sensors 25 may include a unique identifier that associates the dispenser 22, 24, 26 with a particular service area 12 or, in the case where the signals are routed through a controller 44 that is assigned to the service area 12, the controller 44 may tag the signals with an identifier unique to the service area 12. Upon detection of a low level condition in one or more of the dispensers 22, 24, 26, the control system 45 can retrieve the file 54 for the respective service area 12 and pull pertinent information related to the alerting dispenser in order to generate the alert message 32.

In addition, the respective service area file 54 may include any type of relevant information, such as complaints, comments, or other conditions that were logged or otherwise entered into the server system 46 from any source related to the service area 12 in general or a particular functional location 36. The alert message 32 may include other tasks or instructions for the attendant 30 to perform while they are in the service area 12 to refill one or more of the dispensers. The files may contain information on events or activities in the building that may affect future service area usage, wherein such information may be automatically or manually entered into the server system 46 from any source, such as from an electronic schedule or calendar maintained by the building supervisor that is automatically imported into the files 54.

As mentioned, certain embodiments will have multiple service areas 2 within a single facility. In this regard, a communications network is configured for these functions, wherein the individual dispensers 22, 24, 26 are considered as network-enabled devices that may be directly connected to the network through a plurality of direct network links, thereby eliminating the need for the bus, router, or other networking equipment. It should also be appreciated that each of the network enabled devices (or a group of such devices) in this configuration may represent a node that, in turn, may be directly connected, multiplexed, or mesh-networked to the network via the direct network links. Further, the direct network links may represent secure communications channels physically hardened against tampering and/or the communications may be encrypted to prevent unauthorized access to information transmitted thereon.

The server system 46 (which may be integrated with a monitoring system 45) may include a host computer, which may be an integrated server, or include any manner of periphery server or other hardware structure. The central processor system 46 may be a single networked computer, or a series of interconnected computers having access to the network via a gateway or other known networking system. Generally, the central server system 46 may include a central controller configured to manage, execute and control the individual terminal dispenser units, and to interface with the network enabled broadcast devices for retrieval/generation and play of the alert messages and other functions described herein. The central server may include a memory for storing program procedures and routines, a microprocessor (MP) for executing the stored programs, a random access memory (RAM) and an input/output (I/O) bus. These devices may be multiplexed together via a common bus, or may each be directly connected via dedicated communications lines, depending on the needs of the system 10.

The central server 46 may be directly or indirectly connected through the I/O bus to any manner of peripheral devices such as storage devices, wireless adaptors, printers, and the like. In addition, a database (DB) may be communicatively connected to the central server and provide a data repository for the storage and correlation of information gathered from the individual dispenser units, receivers, display devices, or nodes of such devices.

It should be appreciated that the network-enabled devices (e.g., the individual dispenser units) may include similar features or may be configured with functionality to allow for an exchange of information required to function as described herein. The network-enabled devices may include a number of internal components, such as a controller having a program memory, a microcontroller or microprocessor (MP), a random access memory (RAM), and an input/output (I/O) bus, all of which may be interconnected via an address or data bus. The server system may include multiple, and even redundant, program memories and random access memories to increase expandability, capacity and/or processing speed.

The program memory and random access memory may be implemented as a solid-state memory, an integrated circuit, a magnetically readable memory, and/or optically readable memories. Further, the program memory may be read only memory (ROM) or may be read/write memory such as a hard disk. In the event that a hard disk is used as the program memory, the data bus may comprise multiple address/data buses, which may be of differing types, and there may be a separate I/O circuit between the data buses.

Network-enabled devices may be distributed throughout a single business establishment and connected with a LAN, or throughout multiple sites and connected with a WAN. Further, the LAN and/or WAN connecting each of the devices may include one or more separate and secure buses, routers, web servers, gateways and other networking equipment to provide continuous and/or redundant connectivity to the network.

Figure 2:
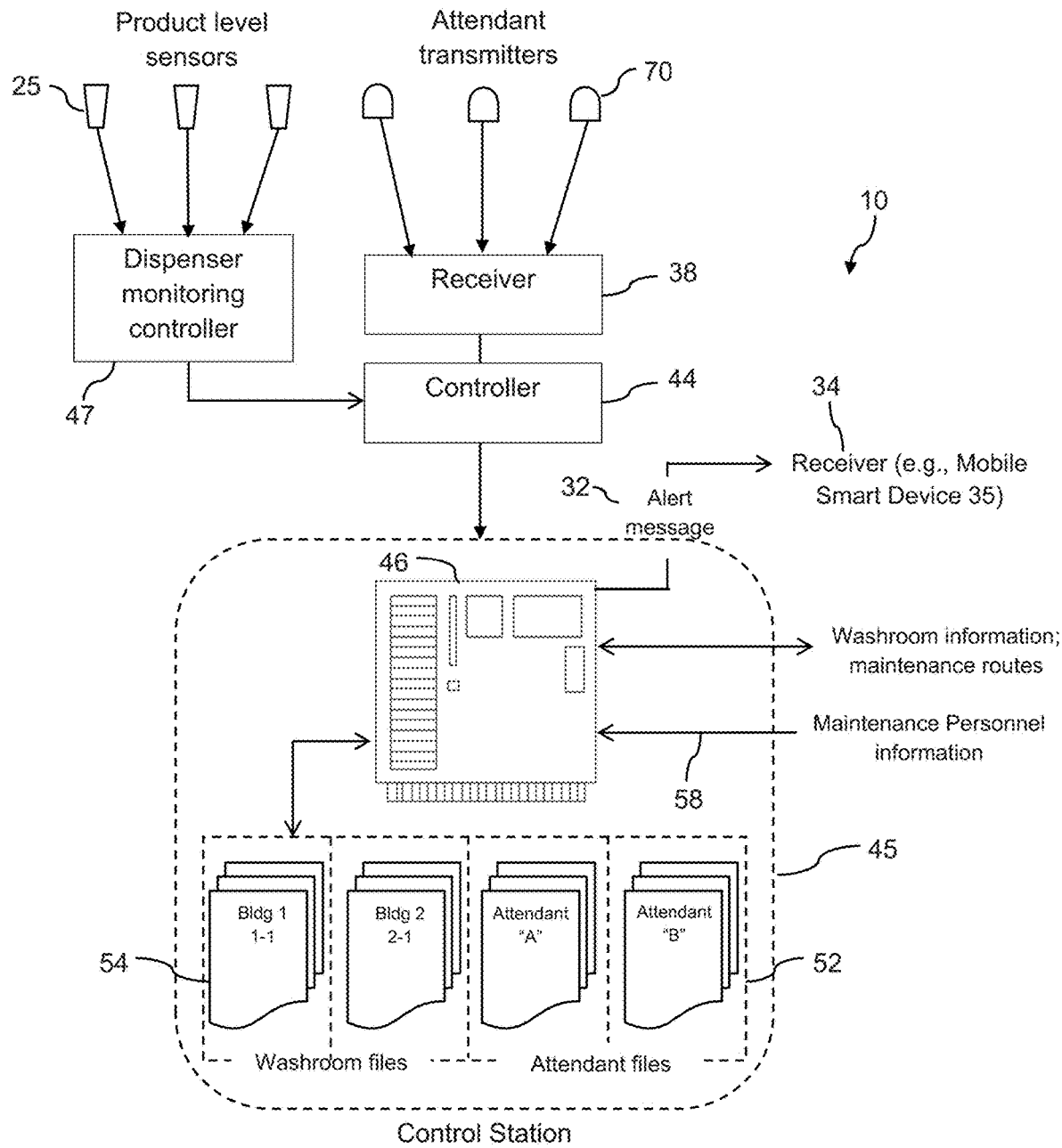
FIG. 2 is a component diagram view of certain control features of a system and method in accordance with the invention.

FIG. 2 is a schematic illustration of certain control aspects of a system 10 in accordance with the invention. In this particular system 10, the central control system 45 includes any manner of computer-implemented server 46 with a library of service area specific files 54 (discussed above). The server system 46 may also include a library 52 attendant-specific files 52 discussed in greater detail below. As discussed above, BTLE beacons 70 are an embodiment of a transmitter 34 carried by the individual attendants 30 that emit unique BTLE signals 72 are received by BTLE enabled receivers 38 strategically located throughout the facility to track attendant location.

FIG. 2 depicts a number of inputs to the server system 46 that enable different types of instructional and alert messages 32 to be generated and transmitted to the attendants. For example, one of the inputs labeled "Maintenance Personnel information" may relate to personalized information for each attendant 30, such as name, job schedule, facility responsibilities, and so forth. Another input relates to service area information, such as special events, historical product usage, cleaning/refill schedules, complaints/comments regarding particular service areas, types of dispensers in the service area, and so forth.

Referring to FIGS. 1 and 2 in general, the method includes detecting the product levels or amounts in the various dispensers 22, 24, 26 via the linked sensors 25 and control station 45. Based on information from the sensors 25, the control station 45 computes a respective refill time for refilling each of the product dispensers 22, 24, 26, which may be computed based on leaving a minimum predetermined amount of product in the dispenser. For example, the refill time may be computed to correspond to an anticipated time when 5% (or other amount) of the product remains in the dispenser.

The method further includes tracking location of the numerous attendants 30 within the facility on a continuous or periodic basis by any suitable system, wherein such location information is also transmitted to the control station 45.

The method includes selecting one of the attendants 30 to service one or more of the product dispensers 22, 24, 26 in a particular service area 12 as a function of the computed refill times and location of the attendants.

An alert message 32 is generated and transmitted to the selected attendant 30, the message 32 giving the location of the particular alerting service area 12 (service area containing the alerting dispenser) within the facility.

The selected attendant 30 is determined such that the attendant reaches the particular service area 12 having the alerting dispenser 22, 24, 26 at or near (within a predetermined acceptable deviation) the computed refill time of the dispenser in the service area 12.

In a particular embodiment, determination of the selected attendant 30 is based on an actual distance from the various attendants 30 to the particular service area 12 when the alert message 32 is generated or transmitted, as well as a predicted time for the selected attendant 30 to reach the particular service area 12 based on any number of facility-specific factors or attendant-specific factors. For example, one attendant 30 may be physically closer to the alerting service area 12, but on a different floor in the building, whereas the selected attendant 30 may be physically more distant, but on the same floor as the alerting service area 12.

In another embodiment, the attendants 30 may have established maintenance routes within the facility that are stored in the attendant files 52 and accessible by the server 46, wherein the predicted refill time is based on the selected attendant 30 reaching the particular service area 12 while proceeding along their maintenance route. The alerting service area 11 may be a service area assigned to the selected attendant's maintenance route or, alternatively, may be a service area 12 assigned to a different attendant's maintenance route. For example, it may be more labor efficient for the selected attendant 30 to deviate from their route to service the alerting service area 12 rather than have the attendant 30 routinely responsible for the service area 12 travel a greater distance within their route to reach the alerting service area 12 at the refill time The alert message 32 may include any manner of additional pertinent information, such as the computed refill time for the alerting dispenser, the type of dispenser, amount of product needed to refill the dispenser, and so on.

In an embodiment depicted for example in FIG. 1, multiple product dispensers 22, 24, 26 are located in the particular service area 12, and when an alert message 32 is generated for any one of the product dispensers, the method may further include making a determination if one or more of the non-alerting product dispensers 22, 24, 26 should be refilled by the selected attendant 30 at the same time as the alerting product dispenser. This additional determination may result in slightly more product wastage from the non-alerting dispensers, but may be beneficial from a labor optimization aspect. A "hard" logic rule may be established by the server system 46 that calls for refill of any other dispenser 22, 24, 26 in the service area when the product level is below a certain value, e.g., below 10% product remaining in the dispenser. The additional determination may include computing the refill times for the non-alerting dispensers 22, 24, 26 and consideration of the location of the other attendants 30 relative to the service area 12. A logic determination can then be made as to whether the selected attendant 30 should refill one or more of the non-alerting dispensers or whether another attendant is to be alerted at a later time.

To compute the dispenser refill times, a real-time depletion rate of the product may be computed by the server 46 based on information from the product sensors 25 over a defined time period. This depletion rate may then be used to estimate a time when the dispenser will reach a depleted condition at which the refill times are triggered. The depletion rates may be used to build a historical database for the respective dispenser, which is saved in the service area files 54, wherein such historical usage data is retrieved and used by the server 46 to compute the refill times for the dispenser.

The alert message 32 need not be transmitted immediately after computing the refill time for any given dispenser 22, 24, 26. For example, the alert message 32 may be stored in a queue and transmitted to the selected attendant 30 when the attendant comes within a defined distance from the particular service area 12 in the course of an established maintenance routine. Alternatively, the alert message 32 may be held in the queue and transmitted to the first of the attendants 30 that come within a defined distance from the service area 12.

In a certain embodiment, instead of fixed maintenance routes for the attendants 30 based solely on location of the service areas 12, the refill requirements of the dispensers 22, 24, 26 in the facility may be used to generate maintenance routes for the attendants 30 within the facility for predefined time periods based on the computed refill times within the predefined time period. For example, these routes may be generated on a shift-by-shift basis. Historical data usage or real time depletion rates may be used by the server 46 to compute the refill times over the entirety of the shift.

The present methodology may also be useful as an attendant training tool. For example, the method may include generating and storing a profile for each attendant 30 as part of the individual attendant files 52, wherein such profile includes characteristics indicative of the individual attendant's speed, ability, or overall effectiveness to refill the product dispensers 22, 24, 26 at the different service areas 12 within the facility. With this attendant-specific profile information, determining the maintenance routes for the attendants 30 may also include a goal of modifying one of the characteristics of one or more of the attendants 30 over time by repetitive product refill alert messages 32. For example, if the profile indicates that a certain attendant 30 has difficulty maintaining the dispensers 22, 24, 26 in a particular service area 12 in their maintenance route, alert messages 32 for this service area 12 can be directed to the attendant 30 on an increased frequency to aid the attendant in becoming more efficient. In another scenario, the repetitive product refill alert messages 32 may be for increasingly more difficult product refill tasks in terms of any one or combination of distance to product dispenser, volume or amount of refill product needed, speed required to complete refill procedure within a defined time from the alert message, relative time in the attendant's work shift, or frequency of refill alert messages.

While the present invention has been described in connection with certain preferred embodiments it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for maintenance of a plurality of service areas within a facility by a plurality of attendants, wherein each service area has one or more consumable product dispensers that require periodic refill, the method comprising:
   for each product dispenser, receiving, by a control system, information detecting a product level or amount condition of product in the product dispenser with a sensor configured with the product dispenser, the sensor in communication with the control system;
   based on information from the sensors, computing, by the control system, a real time depletion rate, and, based upon the real time depletion rate and historical depletion data, calculating a respective refill time for refilling each of the product dispensers;
   tracking, by the control system, location of the maintenance attendants within the facility;
   as a function of the computed refill times, location of the attendants, and distance between the location of the attendants and one or more of the product dispensers in a particular service area containing an alerting product dispenser, selecting, by the control system, one of the attendants to service the alerting product dispenser and, optionally, one or more of the product dispensers in the particular service area containing the alerting product dispenser;
   communicating and transmitting, by the control system, an alert message to the selected attendant that gives the location of the particular service area containing the alerting product dispenser within the facility and the computed refill time for the alerting product dispenser, and instructing the selected attendant to service the particular service area containing the alerting product dispenser on or before the computed refill time for the alerting product dispenser; and
   wherein the selected attendant is determined such that the selected attendant reaches the particular service area containing the alerting product dispenser at or near the computed refill time of the alerting product dispenser in the particular service area;
   wherein determination of the selected attendant is based on a predicted time for the selected attendant to reach the particular service area from an actual position of the selected attendant; and
   wherein the attendants have established maintenance routes within the facility, and determination of the selected attendant is further based on the selected attendant reaching the particular service area at the predicted time while proceeding along their established maintenance route,
   further comprising defining maintenance routes for the attendants within the facility for predefined time periods based on the computed refill times within the predefined time period.

2. The method as in claim 1, wherein the product dispensers are any one or combination of towel dispenser, soap dispenser, or toilet tissue dispenser.

3. The method as in claim 2, wherein the sensors are any one or combination of mechanical sensor, non-contact electrical sensor, weight sensor, or optical sensor.

4. The method as in claim 1, wherein determination of the selected attendant is also based on an actual distance between the selected attendant and the particular service area.

5. The method as in claim 1, wherein the particular service area is a service area assigned to the selected attendant's maintenance route.

6. The method as in claim 1, wherein the particular service area is a service area assigned to a different attendant's maintenance route.

7. The method as in claim 1, wherein the alert message also includes the refill time for the one or more product dispensers in the particular service area.

8. The method as in claim 1, wherein multiple product dispensers are located in the particular service area, and when an alert message is generated for any one of the product dispensers in the particular service area, the method further comprises making a determination, by the control system, if one or more non-alerting product dispensers in the particular service area should be refilled by the selected attendant at the same time as the alerting product dispenser.

9. The method as in claim 8, wherein the determination of whether the non-alerting product dispensers should be refilled is based on the computed refill time for the non-alerting product dispensers and location of other attendants in the facility.

10. The method as in claim 1, wherein the alert message is transmitted to the selected attendant when the selected attendant comes within a defined distance from the particular service area.

11. The method as in claim 10, wherein the selected attendant is determined to be a first one of the service area attendants that comes within the defined distance from the particular service area.

12. The method as in claim 1, further comprising generating and storing, by the control system, a profile for each of the attendants, the profile including characteristics indicative of the individual attendant's speed and ability to refill the product dispensers at the service areas within the facility, and wherein the defining maintenance routes for the attendants include consideration of the attendant profiles.

13. The method as in claim 1, further comprising generating and storing, by the control system, a profile for each of the attendants, the profile including characteristics indicative of the individual attendant's speed and ability to refill the product dispensers at the service areas within the facility, and wherein determination of the selected attendant includes consideration of the attendant profiles in addition to attendant location.

14. The method as in claim 13, further comprising:
   monitoring, by the control system, and updating the attendant profiles; and
   determining, by the control system, the selected attendant based on a characteristic in a particular attendant's profile desired to be modified over time by repetitive product refill alert messages.

15. The method as in claim 14, wherein the repetitive product refill alert messages are for increasingly more difficult product refill tasks in terms of any one or combination of distance to product dispenser, volume or amount of refill product needed, speed required to complete refill procedure within a defined time from alert message, relative time in the attendant's work shift, or frequency of refill alert messages.

* * * * *